൹nited States Patent Office 2,813,001
Patented Nov. 12, 1957

2,813,001

URANIUM PURIFICATION PROCESS

John R. Ruhoff, Webster Groves, Mo., and Charles E. Winters, Oak Ridge, Tenn., assignors to the United States of America as represented by the United States Atomic Energy Commission No Drawing. Application December 6, 1949, Serial No. 131,511

6 Claims. (Cl. 23—14.5)

This invention relates to a uranium purification process and more specifically relates to the purification of uranyl nitrate by an extraction process.

In uranium-containing ores, for example, pitchblende, uranium values are associated with compounds of other metals. A typical analysis of pitchblende ore is as follows:

|  | Percent |
| --- | --- |
| $U_3O_8$ | 50–65 |
| $SiO_2$ | 16–21 |
| $PbO$ | 5–6.5 |
| $Fe_2O_3$ | 0.25–0.50 |
| $MoO_3$ | 0.5–0.8 |
| $NiO$ | 0.5–2.2 |
| $Al_2O_3$ | about 0.6 |
| $CaO$ | 0.4–1.0 |
| $MgO$ | about 2.2 |
| $CuO$ | 0.10–0.35 |
| $CO$ | about 0.17 |
| $MnO_2$ | 0.02–0.05 |
| $V_2O_3$ | about 0.06 |
| $TiO_2$ | about 0.06 |
| $BaO$ | about 0.06 |
| Rare earths | about 0.16 |
| $CO_2$ | about 1.5 |
| $SO_3$ | about 0.45 |
| $P_2O_5$ | about 1.11 |

In the recovery of uranium values from such ores by digestion with nitric acid, there is usually obtained a uranyl nitrate solution which will contain some of the other metal values tabulated above. These contaminants include iron, molybdenum, and vanadium values, as well as radioactive elements such as $UX_1$ (a thorium isotope). Similarly, in the processing of carnotite ore, which contains uranium values and vanadium, ore treatment processes have been developed which separate the uranium values from the major proportion of the vanadium values. In such cases, commercial $U_3O_8$ is obtained and then aqueous uranyl nitrate solutions are produced therefrom. In the solutions there are certain contaminants including vanadium, iron, and chlorine (as chloride) values. For some purposes, the uranium recovered from such solutions is sufficiently pure, since the impurities constitute only 1 to 2% of the uranium metal produced from the uranyl nitrate solutions. For certain uses of uranium, it is very desirable, and in some cases necessary, that the amount of impurities associated with the uranium be practically eliminated, i. e., that the uranium be at least 99.9% pure. Uranyl nitrate hexahydrate crystals are recovered from said aqueous uranyl nitrate solutions by evaporation of the solutions.

It is an object of the present invention to provide a process for the purification of uranyl nitrate.

Other objects and advantages of this invention will be apparent from the description which follows.

We have discovered that uranyl nitrate substantially free of impurities normally associated therewith in its production by the nitric acid dissolution of uranium values from ores and ore concentrates can be obtained by forming a solution of uranyl nitrate in an organic solvent, extracting the organic solvent solution with relatively small quantities of substantially saturated uranyl nitrate aqueous solutions, extracting with a relatively small volume of water and then extracting the remaining uranyl nitrate from the organic solvent solution by means of relatively large volumes of water. It had been found that relatively small amounts of water were suitable for extracting the small amounts of impurities in the organic solvent solutions of uranyl nitrate. However, the loss of uranyl nitrate, which was extracted along with the impurities, was considerable. By the process of the present invention the loss of uranyl nitrate in this purification can be very greatly reduced by using quantities of saturated, or substantially saturated, uranyl nitrate aqueous solutions for the extraction of impurities. These substantially saturated aqueous uranyl nitrate wash solutions are obtained from previous batches of the process of this invention so that the loss of uranyl nitrate by the present process is that loss occasioned by the extraction with one small quantity of water. The uranyl nitrate wash solutions are used in their order of decreasing content of impurities. By carrying out this process, it is possible to purify the uranyl nitrate without a substantial loss of uranyl nitrate.

In carrying out the present invention, it is preferred that the organic solvent solution of uranyl nitrate be formed to provide a uranyl nitrate concentration of at least 20% by weight. Suitable types of water-immiscible organic solvents are ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. Diethyl ether is the preferred organic solvent. It is especially preferred that the uranyl nitrate solution in the organic solvent be formed to provide a substantially saturated solution of uranyl nitrate, e. g., a 50% (by weight) uranyl nitrate solution in ether.

It is apparent from the foregoing that the process of this invention is a batch process and that in carrying out this process, solutions are used as wash solutions which are substantially saturated with respect to uranyl nitrate and these wash solutions are obtained from prior batches of this process. The wash uranyl nitrate solution obtained by the first extraction of the organic solvent solution of uranyl nitrate is discarded. It may be added to an aqueous uranyl nitrate solution to be used for the preparation of uranyl nitrate hexahydrate, which is then added to the organic solvent to form the uranyl nitrate solution in accordance with the process of the present invention. In forming the organic solvent solution of uranyl nitrate by dissolving uranyl nitrate hexahydrate in the organic solvent, an aqueous phase separates, and this aqueous phase contains part of the impurities. The volume of water used as a final wash of impurities is preferably less than 10% of the volume of the organic solvent, since this volume determines the uranium loss in the instant process. This volume will determine the volumes of substantially saturated uranyl nitrate aqueous wash solutions produced and to be used in extracting impurities in subsequent batches. It is preferred that at least three quantities of such uranyl nitrate wash solution from prior batches be used.

The following examples will illustrate the present process.

*Example I*

Five separatory funnels were numbered 0, 1, 2, 3, and 4, respectively. These numbers corresponded to the number of washings to which a diethyl ether solution of uranyl nitrate would be subjected. Four extraction experiments were carried out using the five separatory funnels.

In the first extraction experiment, a substantially saturated diethyl ether solution of uranyl nitrate was obtained in funnel No. 0 by shaking 282 g. of uranyl nitrate hexahydrate with 150 g. of diethyl ether. The aqueous layer that formed was drawn off at the bottom through the stopcock. The diethyl ether layer was poured out of the top of the separatory funnel after removal of the aqueous layer. The ether layer was transferred to funnel No. 1 to which 10 ml. of distilled water was added and the contents of funnel No. 1 were shaken for two minutes. Upon standing, an aqueous phase and an ether phase formed. The aqueous layer was withdrawn. The ether solution was transferred successively to funnels numbered 2, 3, and 4, where it was similarly extracted with 10-ml. quantities of distilled water. The aqueous layers from funnels numbered 2, 3, and 4 were transferred to funnels numbered 1, 2, and 3, respectively. The ether layer from funnel No. 4 contained very pure uranyl nitrate.

In the second extraction experiment, the ether solution was formed in funnel No. 0 as in the first extraction experiment. The water layer was removed from funnel No. 0. The ether solution was transferred successively to funnels numbered 1, 2, and 3 where it was agitated with the aqueous solutions previously transferred there from funnels numbered 2, 3, and 4, respectively, in the first experiment. The aqueous layer from funnel No. 1 was withdrawn and the aqueous solutions from funnels numbered 2 and 3 were transferred to funnels numbered 1 and 2, respectively. The ether layer from funnel No. 3 was transferred to funnel No. 4 where it was agitated with 10 ml. of water. Upon standing, the aqueous layer formed was transferred to funnel No. 3 while the ether layer was removed to complete this extraction experiment.

In the third extraction experiment, the uranyl nitrate solution in diethyl ether was formed as in the previous extraction experiments. The aqueous layer from funnel No. 0 was withdrawn, while the ether solution was transferred successively to funnels numbered 1, 2, and 3 where it was agitated with the aqueous solutions from funnels numbered 2, 3, and 4 in the second experiment. Upon standing, the aqueous layer from funnel No. 1 was removed. The aqueous layers from funnels numbered 2 and 3 were transferred as in the second extraction experiment. The ether layer was transferred to funnel No. 4 where it was contacted with 10 ml. of distilled water. Upon settling, the aqueous layer was transferred from funnel No. 4 to funnel No. 3 and the ether layer was withdrawn from funnel No. 4.

In the fourth extraction experiment, the ether solution of uranyl nitrate was prepared as in previous extraction experiments to produce an aqueous layer in funnel No. 0 which was withdrawn. The ether solution was transferred successively to funnels numbered 1, 2, and 3 where it was agitated with the aqueous solutions from funnels numbered 2, 3, and 4 in the third extraction experiment. The ether solution was finally agitated with 10 ml. of distilled water in funnel No. 4. The aqueous layers were transferred as in the previous experiments.

It is apparent from the foregoing description of the four extraction experiments that only the first extraction experiment used distilled water for all four wash solutions. In the other three extraction experiments the wash solutions in funnels numbered 1, 2, and 3 used aqueous layers obtained from previous extractions and distilled water was used only in funnel No. 4. Of course, it was not until the fourth extraction experiment that the substantially saturated uranyl nitrate aqueous solutions used for wash solutions in funnels numbered 1, 2, and 3 had been used in a manner in which subsequent batches of uranyl nitrate would be treated according to the present invention. Thus, the fourth extraction experiment represents the process of this invention.

The uranyl nitrate used in these experiments, of course, contained $UX_1$ (a thorium isotope) and it was possible to determine the degree of thorium decontamination of the uranium by determining the beta activities of the ether and aqueous phases for the four extraction experiments. The beta activities were determined by means of a Geiger-Müller counter. The beta counts in the aqueous layers obtained from funnels numbered 0, 1, 2, 3, and 4 were determined on small aliquots of these solutions and the data are tabulated as follows:

| $\beta$ counts/min. in aliquot of aqueous layer from funnel No. | Extraction 1 | Extraction 2 | Extraction 3 | Extraction 4 |
|---|---|---|---|---|
| 0 | 11,700 | 10,000 | 10,000 | 9,800 |
| 1 | 1,764 | 1,930 | 2,525 | 1,940 |
| 2 | 336 | 490 | 668 | 612 |
| 3 | 51 | 145 | 190 | 261 |
| 4 | 21 | 86 | 41 | 54 |

These data show that the process of this invention is as effective as the same number of small quantities of water for the removal of impurities. Of course, the present invention has the advantage that the loss of uranium values from the ether solution during the purification process is very substantially less than the loss using small water washes. In analogous experiments the aqueous phases obtained were analyzed for impurities which are deleterious neutron absorbers, i. e., have relatively high neutron-absorbing capacity. A satisfactory purification of uranyl nitrate was indicated.

*Example II*

A 4,800-lb. quantity of commercial $U_3O_8$ was added to a stainless steel tank containing a stirred mixture of 4,688 lbs. of 38°-Baumé nitric acid and 2,225 lbs. of water maintained at a temperature of 90° C. by means of a steam coil. Nitric oxide evolved from the solution was carried by suction to a nitric-acid-recovery system. The uranium oxide and acid solution in the tank were stirred until the major portion of the oxide was dissolved. The solution was pumped through a filter press to two tanks in which the filtered solutions of uranyl nitrate were boiled until the boiling point of 118° C. was reached. This boiling point is that of a uranyl nitrate hexahydrate, which has a melting point of about 60° C. The molten uranyl nitrate hexahydrate was then pumped to a measuring tank where it was cooled to 80–85° C. A 3,000-lb. quantity of molten uranyl nitrate was withdrawn and added in increments to an extraction tower containing 300 gal. of diethyl ether, while the ether was circulated by a pump from the bottom of the tower, through a water cooler, and finally to the top of the tower. Ether vaporized from the extractor was condensed and returned to the extractor. The rate of uranyl nitrate hexahydrate was adjusted so that the maximum temperature of the ether was 31° C. and ether was cooled to 27° C. between additions of uranyl nitrate hexahydrate. Two phases were produced. The aqueous phase which contained the water of hydration and a substantial quantity of the impurities was removed and discarded. The ether solution in the extractor was successivley treated with aqueous solutions from five recycle tanks and a water wash from a sixth tank as follows: The aqueous solution from the recycle tank was circulated through the extraction tower for two minutes and then allowed to settle for four minutes. The aqueous solution from recycle tank No. 1 was discarded after settling in the tower, while the aqueous solution from recycle tank No. 2 was transferred from the tower to recycle tank No. 1. Similarly, the aqueous solutions from recycle tanks numbered 3, 4, and 5 were transferred from the tower to recycle tanks numbered 2, 3, and 4, respectively. After contacting the diethyl ether solution of uranyl nitrate with the aqueous solution from recycle tank No. 5 and withdrawing the aqueous layer from the extractor to recycle tank No. 4, 20 gal. of distilled water was withdrawn from tank No. 6 and circulated through the extractor for two minutes, and after settling for four minutes the aqueous layer was withdrawn from the extractor and transferred to recycle tank No. 5. The uranyl nitrate was then extracted from the diethyl ether solution by means of four 50-gal. quantities of distilled water and the aqueous layers produced were combined and transferred to a tank where dissolved diethyl ether was driven off by heating the aqueous solution using a steam coil.

In using the foregoing plant equipment, it is necessary in connection with the first batch to use distilled water in all of the recycle tanks. However, after the first batch, distilled water is used only from tank No. 6. Obviously, after the first five batches of this process, the recycle tanks numbered 1 through 5 contain saturated uranyl nitrate aqueous solutions from previous batches and the amount of impurities vary, the aqueous solution in recycle tank No. 1 having the greatest concentration of impurities extracted from the ether solution of uranyl nitrate.

By the process of the present invention, it is possible to purify uranyl nitrate to such a high degree that the uranium is suitable for use in a neutronic reactor, where only very low concentrations of deleterious neutron-absorbing impurities originally associated with natural uranium may be present.

The foregoing illustrations of the present invention are not intended to limit its scope, which is to be limited entirely by the appended claims.

What is claimed is:

1. A batch process for the purification of uranyl nitrate, which comprises forming a solution of uranyl nitrate in a water-immiscible organic solvent, said uranyl nitrate containing impurities normally associated therewith by nitric acid dissolution of uranium values from uranium-bearing ores, contacting said organic solvent solution of uranyl nitrate successively with relatively small amounts of substantially saturated aqueous solutions of uranyl nitrate, said solutions being obtained from previous batches of this process, and separating the aqueous phases, contacting the resultant organic solvent solution phase with a relatively small amount of water, separating an organic solvent phase and an aqueous phase substantially saturated with respect to uranyl nitrate, and extracting the uranyl nitrate remaining in the organic solvent phase with relatively large amounts of water.

2. The process of claim 1 wherein the organic solvent solution of uranyl nitrate contains at least 20% by weight of uranyl nitrate.

3. The process of claim 2 wherein the water-immiscible organic solvent is diethyl ether.

4. The process of claim 3 wherein the diethyl ether solution of uranyl nitrate formed is a substantially saturated ether solution of uranyl nitrate and the relatively small amount of water constitutes less than 10% of the initial volume of diethyl ether solution of uranyl nitrate.

5. The process of claim 4 wherein the number of relatively small amounts of substantially saturated uranyl nitrate aqueous solution is at least three and the solution is saturated uranyl nitrate aqueous solution.

6. A batch process for the purification of uranyl nitrate, which comprises forming a substantially saturated solution of uranyl nitrate in diethyl ether, said uranyl nitrate containing impurities normally associated therewith by nitric acid dissolution of uranium values from a uranium-bearing ore, contacting the ether solution of uranyl nitrate successively with relatively small amounts of substantially saturated aqueous solutions of uranyl nitrate, said solutions being obtained from previous batches of this process, and separating the aqueous phases, contacting the resultant ether phase with a relatively small amount of water, separating an ether phase and an aqueous phase substantially saturated with respect to uranyl nitrate, and extracting the uranyl nitrate remaining in the ether phase with relatively large amounts of water.

References Cited in the file of this patent

UNITED STATES PATENTS 2,227,833    Hixson et al. _____ Jan. 7, 1941

OTHER REFERENCES

Perry: Chemical Engineer's Handbook 2nd ed. pp. 1217–18 (1941). Pub. by McGraw-Hill Book Co., N. Y.